(12) United States Patent
Jung et al.

(10) Patent No.: US 11,481,047 B2
(45) Date of Patent: Oct. 25, 2022

(54) STYLUS PEN RESONATING WITH A SIGNAL TRANSFERRED FROM A TOUCH SENSOR

(71) Applicant: HiDeep Inc., Seongnam-si (KR)

(72) Inventors: Kiryoung Jung, Seongnam-si (KR); Hyoungwook Woo, Seongnam-si (KR); Seyeob Kim, Seongnam-si (KR); Bonkee Kim, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 30 days.

(21) Appl. No.: 17/258,497

(22) PCT Filed: Jul. 4, 2019

(86) PCT No.: PCT/KR2019/008186
§ 371 (c)(1),
(2) Date: Jan. 7, 2021

(87) PCT Pub. No.: WO2020/017794
PCT Pub. Date: Jan. 23, 2020

(65) Prior Publication Data
US 2021/0132711 A1    May 6, 2021

(30) Foreign Application Priority Data
Jul. 18, 2018    (KR) .................. 10-2018-0083626

(51) Int. Cl.
*G06F 3/044*    (2006.01)
*G06F 3/0354*    (2013.01)

(52) U.S. Cl.
CPC ........ *G06F 3/03545* (2013.01); *G06F 3/0441* (2019.05)

(58) Field of Classification Search
CPC .................. G06F 3/03545; G06F 3/0441
See application file for complete search history.

(56) References Cited

U.S. PATENT DOCUMENTS

| | | | |
|---|---|---|---|
| 2005/0162411 A1* | 7/2005 | Berkel van | G06F 3/0442 345/179 |
| 2008/0150550 A1* | 6/2008 | Vos | G06F 3/046 324/655 |
| 2016/0147320 A1* | 5/2016 | Krumpelman | G06F 3/04166 345/179 |

FOREIGN PATENT DOCUMENTS

| | | |
|---|---|---|
| JP | 2005-529414 | 9/2005 |
| JP | 2012-221304 | 11/2012 |
| KR | 10-2011-0002073 | 1/2011 |
| KR | 10-2015-0041488 | 4/2015 |
| KR | 10-2016-0016260 | 2/2016 |
| KR | 10-2016-0025440 | 3/2016 |

OTHER PUBLICATIONS

KIPO, PCT Search Report & Written Opinion of PCT/KR2019/008186 dated Oct. 4, 2019.

* cited by examiner

*Primary Examiner* — Lisa S Landis
(74) *Attorney, Agent, or Firm* — Lex IP Meister, PLLC

(57) ABSTRACT

An exemplary embodiment of the present invention provides a stylus pen including: a body portion; a conductive tip configured to be exposed from an inside of the body portion to an outside thereof; a resonance circuit portion positioned in the body portion to be connected to the conductive tip to resonate an electrical signal transferred from the conductive tip; and a conductive blocking member configured to surround at least a portion of the resonance circuit portion.

29 Claims, 34 Drawing Sheets

(a)

STYLUS PEN RESONATING WITH A SIGNAL TRANSFERRED FROM A TOUCH SENSOR

TECHNICAL FIELD

The present disclosure relates to a stylus pen.

BACKGROUND ART

Various terminals such as mobile phones, smart phones, tablet PCs, laptop computers, digital broadcasting terminals, PDAs (personal digital assistants), PMPs (portable multimedia players), and navigation devices include touch sensors.

In such a terminal, a touch sensor may be disposed on a display panel displaying an image, or may be disposed in an area of a terminal body. As a user interacts with the terminal by touching the touch sensor, the terminal may provide the user with an intuitive user interface.

The user may use a stylus pen for sophisticated touch input. The stylus pen may transmit and receive signals to and from the touch sensor in an electrical and/or magnetic manner.

The above information disclosed in this Background section is only for enhancement of understanding of the background of the invention, and therefore it may contain information that does not form the prior art that is already known in this country to a person of ordinary skill in the art.

DISCLOSURE

Technical Problem

Exemplary embodiments have been made in an effort to provide a stylus pen that resonates with a signal transferred from a touch sensor.

Exemplary embodiments have been made in an effort to provide a stylus pen in which a resonance frequency can be maintained.

Technical Solution

For achieving the objects or other objects, an exemplary embodiment of the present invention provides a stylus pen including: a body portion; a conductive tip configured to be exposed from an inside of the body portion to an outside thereof; a resonance circuit portion positioned in the body portion to be connected to the conductive tip to resonate an electrical signal transferred from the conductive tip; and a conductive blocking member configured to surround at least a portion of the resonance circuit portion.

The stylus pen may further include a ground portion configured to be capable of being electrically connected to a user.

The resonance circuit portion may include an inductor portion connected between the conductive tip and the ground portion; and a capacitor portion connected between the conductive tip and the ground portion.

The blocking member may surround only the inductor portion.

The blocking member may include one slit that blocks generation of an eddy current, opposite ends of the blocking member may be spaced apart from each other in a first direction by the slit, and the first direction may be the direction in which the eddy current is generated.

The blocking member may further include a connector spaced apart from the inductor portion in the body portion along a second direction that is perpendicular to the first direction to connect opposite ends of the blocking portion.

The connector may be electrically connected to the ground portion.

The blocking member may include a plurality of first blocking units spaced apart from each other along the first direction and extending along a second direction that is perpendicular to the first direction, the first direction is a direction in which the eddy current is generated, and the first blocking units may be conductive.

The blocking member may include a connector spaced apart from the inductor portion in the body portion along the second direction to connect the first blocking units.

The connector may be electrically connected to the ground portion.

The blocking member may include a plurality of second blocking units extending along the first direction and spaced apart from each other along a second direction that is perpendicular to the first direction, the first direction may be a direction in which an eddy current is generated, and opposite ends of each of the second blocking units may be spaced apart along the first direction.

The blocking member may further include a connector extending along a second direction to connect a plurality of second blocking units, and an additional ground portion spaced apart from the inductor portion in the body portion along the second direction and connected to the connector.

The additional ground portion may be electrically connected to the ground portion.

The inductor portion may include a ferrite core and a conductive coil connected terminal of the conductive tip and wound around the ferrite core.

The capacitor unit may include a plurality of capacitors connected in parallel and having different capacitances.

The blocking member may be disposed on an inner surface of the body portion.

The blocking member may be disposed on an external surface of the body portion.

The blocking member may be disposed between the inner and outer surfaces of the body portion.

Another exemplary embodiment of the present invention provides a stylus pen including: a body portion; a conductive tip configured to be exposed from an inside of the body portion to an outside thereof; a resonance circuit portion positioned in the body portion to be connected to the conductive tip to resonate an electrical signal transferred from the conductive tip; and a conductive blocking member configured to surround at least a portion of the body portion.

The blocking member may include one slit that blocks generation of an eddy current, opposite ends of the blocking member may be spaced apart from each other in a first direction by the slit, and the first direction may be a direction in which an eddy current is generated.

The resonance circuit portion may include an inductor portion connected between the conductive tip and the ground portion, a capacitor portion connected between the conductive tip and the ground portion, and a conductive connection member configured to connect the conductive tip and the inductor portion.

Yet another exemplary embodiment of the present invention provides a stylus pen including: a body portion; a conductive blocking member configured to surround at least a portion of the body portion, and a conductive tip configured to be exposed from an inside of the body portion to an outside thereof, at least one slit configured to block generation of an eddy current.

The blocking member may be disposed on an inner surface of the body portion.

The blocking member may be disposed on an external surface of the body portion.

The blocking member may be disposed between the inner and outer surfaces of the body portion.

The blocking member may include a plurality of blocking units plated on a sheet.

The blocking member may include a plurality of blocking units plated on the body portion.

Advantageous Effects

The effects of the stylus pen according to the present disclosure will be described as follows.

According to at least one of the exemplary embodiments of the present disclosure, it is possible to provide a stylus pen that is robust against external factors.

According to at least one of the exemplary embodiments of the present disclosure, it is possible to improve touch sensitivity of a touch sensor.

The additional range of applicability of the present disclosure will become apparent from the following detailed description. However, since various modifications and alternatives within the spirit and scope of the present disclosure may be clearly understood by those skilled in the art, it is to be understood that a detailed description and a specific exemplary embodiment of the present invention are provided only by way of example.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

In addition, unless explicitly described to the contrary, the word "comprise" and variations such as "comprises" or "comprising" will be understood to imply the inclusion of stated elements but not the exclusion of any other elements.

Figure 1:
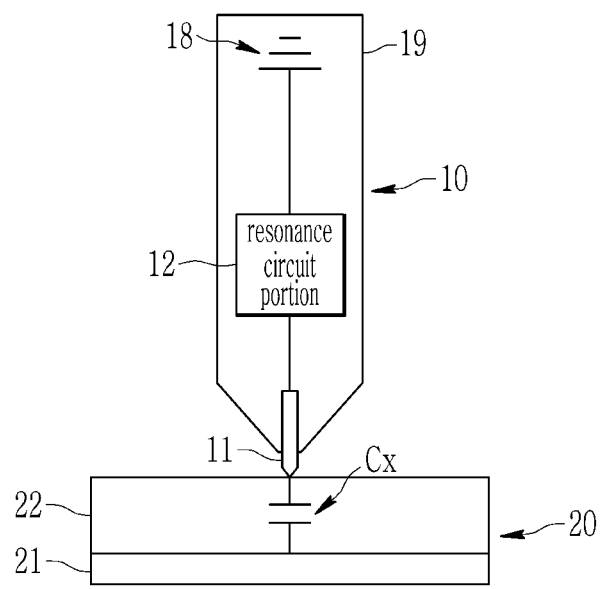
FIG. 1 illustrates a schematic view showing a stylus pen and a touch sensor.
Figure 2:
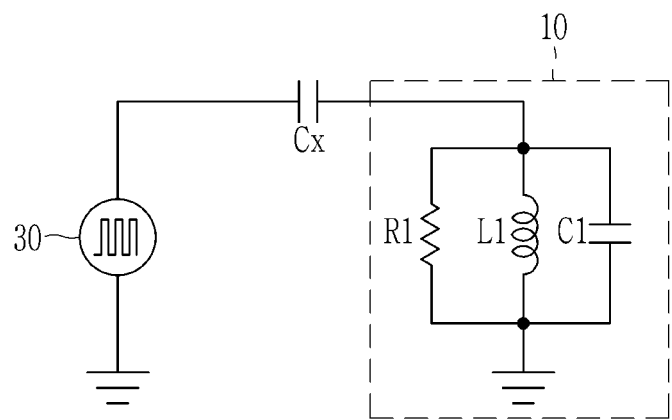
FIG. 2 illustrates a schematic circuit diagram showing a stylus pen and a touch sensor.

FIG. 1 illustrates a schematic view showing a stylus pen and a touch sensor, and FIG. 2 illustrates a schematic circuit diagram showing a stylus pen and a touch sensor.

As illustrated in FIG. 1, a stylus pen 10 and a touch sensor 20 may become close to each other.

The stylus pen 10 may include a conductive tip 11, a resonance circuit portion 12, a ground portion 18, and a body portion 19.

The conductive tip 11 is connected with the resonance circuit portion 12. All or part of the conductive tip 11 may be formed of a conductive material (e.g., a metal), or the conductive tip 11 may have a form in which a portion of the conductive tip 11 is exposed to an outside of a non-conductive housing while being present inside the non-conductive housing, but it is not limited thereto.

The conductive tip 11 is connected with the resonance circuit portion 12. The resonance circuit portion 12 may resonate with a driving signal that is inputted from the touch sensor 20. The driving signal may include a signal TX transferred to the touch electrode, a signal RX generated from the touch electrode, or the like, but the present invention is not limited thereto.

The resonance circuit portion 12 may output a resonance signal caused by resonance to the conductive tip 11 during and after the driving signal is inputted. The resonance circuit portion 12 is positioned in the body portion 19 to be connected to the ground portion 18.

The touch sensor 20 may include a channel electrode 21 and a window 22 disposed at an upper portion of the channel electrode 21. The channel electrode 21, the conductive tip 11, and the window 22 may constitute a capacitor Cx.

As illustrated in FIG. 2, the stylus pen 10 of FIG. 1 may be represented by an equivalent circuit including a resistor R1, an inductor L1, and a capacitor C1.

A driving signal 30 having a predetermined frequency is transferred to the stylus pen 10 through the capacitor Cx. Then, the resonance circuit portion 12 including the inductor L1 and the capacitor C1 of the stylus pen 10 may resonate with the driving signal 30. For resonance, a resonance frequency of the resonance circuit portion 12 and a frequency of the driving signal must be the same or very similar.

A user holds the stylus pen 10 and touches the touch sensor 20 by using the conductive tip 11. This will be described with reference to FIG. 3 and FIG. 4.

Figure 3:
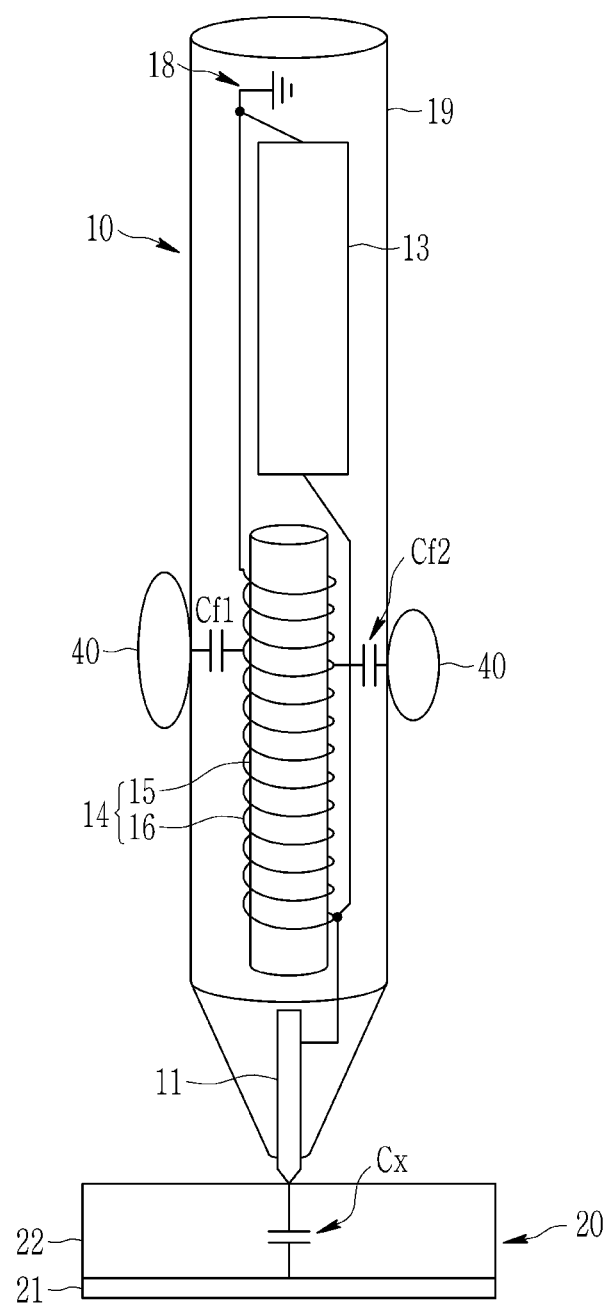
FIG. 3 illustrates a schematic view showing a stylus pen and a touch sensor when the stylus pen is held.
Figure 4:
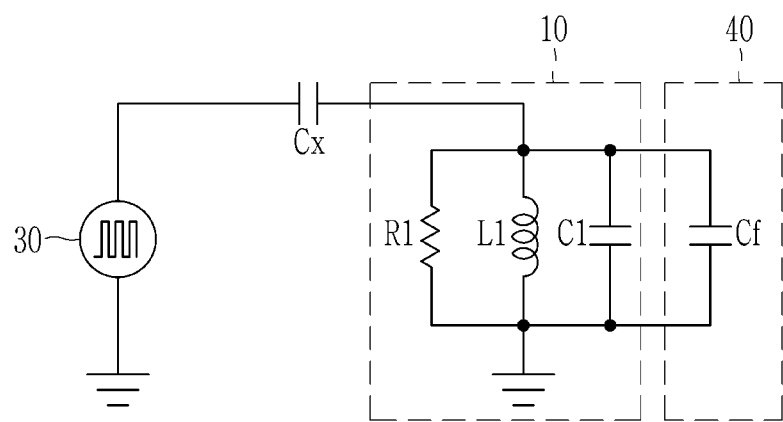
FIG. 4 illustrates a schematic circuit diagram showing a stylus pen and a touch sensor when the stylus pen is held.

FIG. 3 illustrates a schematic view showing a stylus pen and a touch sensor when the stylus pen is held, and FIG. 4 illustrates a schematic circuit diagram showing a stylus pen and a touch sensor when the stylus pen is held.

As illustrated in FIG. 3, the stylus pen 10 includes the conductive tip 11, a capacitor portion 13, an inductor portion 14, the ground portion 18, and the body portion 19.

The inductor portion 14 includes a ferrite core 15 and a coil 16 that is wound around the ferrite core 15. The inductance of the inductor portion 14 is proportional to the magnetic coefficient μ, a cross-sectional area S of the coil 160, and a square of the number of turns N, and is inversely proportional to a length l of the coil 16, by $L = \mu S N^2 / l$.

The stylus pen 10 is held by a user's finger 40, etc., and in this case, parasitic capacitances Cf1 and Cf2 are generated by the finger 40 and an internal conductor (coil, wire, etc.) of the stylus pen 10.

In FIG. 4, the parasitic capacitance Cf caused by the user's finger 40 is illustrated. That is, the resonance frequency of the stylus pen 10 is changed by the parasitic capacitance Cf. Then, a frequency of the driving signal 30 and a resonance frequency of the stylus pen 10 do not coincide, and thus a magnitude of the signal that is outputted from the stylus pen 10 decreases.

A stylus pen for preventing a change in resonance frequency due to a user's grip will be described with reference to FIG. 5.

Figure 5:
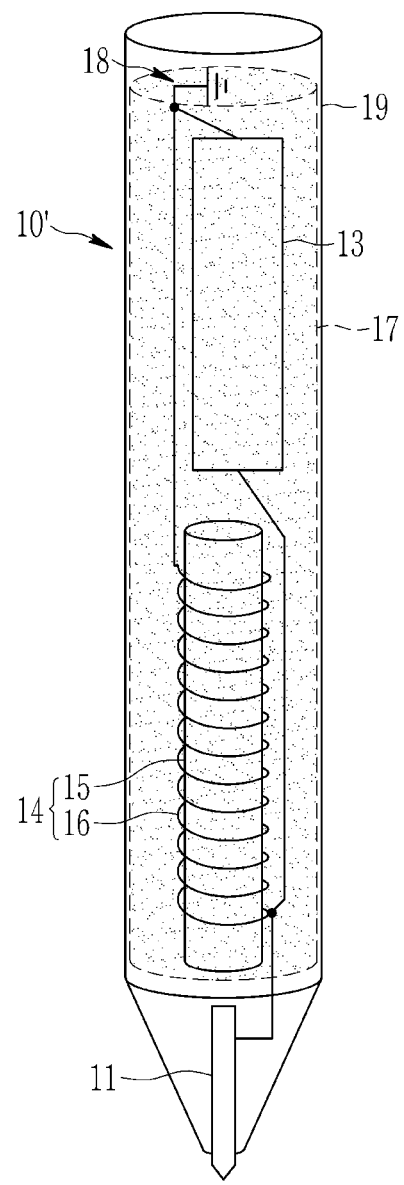
FIG. 5 illustrates a schematic view of a stylus pen.

FIG. 5 illustrates a schematic view of a stylus pen. A stylus pen 10' illustrated in FIG. 5 further includes a blocking member 17 as compared to the stylus pen 10 of FIG. 3.

The blocking member 17, which is a conductive member surrounding the capacitor portion 13 and the inductor portion 14, may prevent parasitic capacitance from being generated by a user's hand. However, the blocking member 17 may generate an eddy current. This will be described with reference to FIG. 6.

Figure 6A:
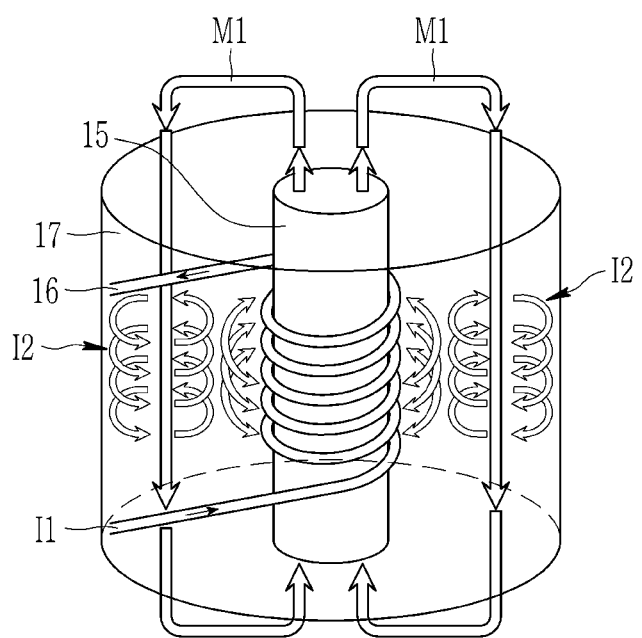
FIG. 6A and FIG. 6B illustrate an exemplary diagram showing an eddy current generated in the stylus pen illustrated in FIG. 5.
Figure 6B:
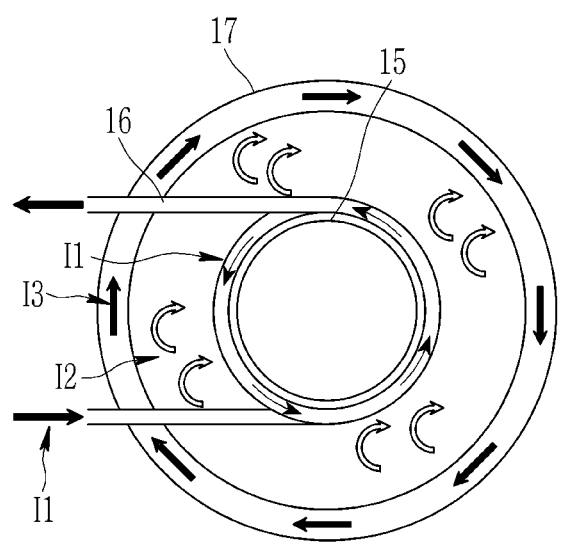

FIG. 6A and FIG. 6B illustrate an exemplary diagram showing an eddy current generated in the stylus pen illustrated in FIG. 5.

As illustrated in FIG. 6A, a current I1 flows through the coil 16 by a driving signal transferred from the conductive tip 11. A magnetic field M1 is formed by the current I1 flowing in the coil 16.

The magnetic field M1 generates a current I2 in a predetermined direction in the blocking member 17. The current I2 may be generated on a plane that is perpendicular to a direction of the magnetic field M1 generated by the inductor portion 140. Currents I2 are combined to generate a clockwise eddy current I3 as illustrated in FIG. 6B.

The magnetic field M1 generated in the coil 16 is suppressed by this eddy current I3. Then, the inductance of the inductor portion 14 changes, and a problem that the resonance frequency of the stylus pen 11 changes according to the change in inductance occurs.

Exemplary embodiments provide a stylus pen that prevents a change in a resonance frequency caused by a user's grip and eddy current generation.

FIG. 7A to FIG. 11B illustrate schematic views showing a structure of a stylus pen according to exemplary embodiments.

Figure 7A:
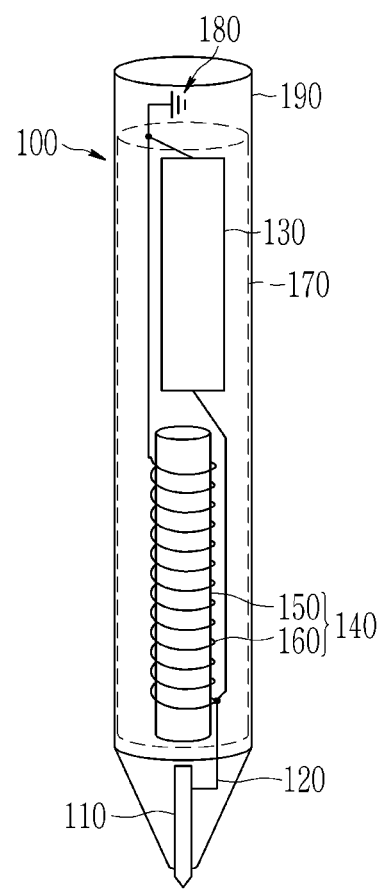
FIG. 7A to FIG. 11B illustrate schematic views showing a structure of a stylus pen according to exemplary embodiments.

Referring to FIG. 7A, the stylus pen 100 includes a conductive tip 110, a conductive connection member 120, a capacitor portion 130, an inductor portion 140, a blocking member 170, a ground portion 180, and a body portion 190.

The conductive tip 110 is electrically connected to the capacitor portion 130 and the inductor portion 140. For example, the conductive tip 110 is directly connected to the capacitor portion 130 and the inductor portion 140 by the conductive connection member 120 or the like.

All or part of the conductive tip 110 may be formed of a conductive material (e.g., a metal), or the conductive tip 110 may have a form in which a portion of the conductive tip 110 is exposed to an outside of a non-conductive housing while being present inside the non-conductive housing, but it is not limited thereto.

The conductive connection member 120, which is a conductive member, may be a wire, a pin, a rod, a bar, or the like, but the present invention is not limited thereto.

The capacitor portion 130 and the inductor portion 140 are positioned within the body portion 190. The capacitor portion 130 may include a plurality of capacitors connected in parallel. The capacitors may have different capacitances, and may be adjusted in a manufacturing process.

The inductor portion 140 may be positioned adjacent to the conductive tip 110. The inductor portion 140 includes a ferrite core 150 and a coil 160 that is wound around the ferrite core 150. The inductance of the inductor portion 140 is proportional to the magnetic coefficient μ, a cross-sectional area S of the coil 160, and a square of the number of turns N, and is inversely proportional to a length l of the coil 160, by $L=\mu S N^2/l$.

The blocking member 170 includes a conductive member surrounding the capacitor portion 130 and the inductor portion 140. The blocking member 170 may be connected to the ground portion 180.

In addition, opposite ends of the blocking member 170 are spaced apart along the direction ED of the eddy current. In this regard, FIG. 7B to FIG. 7E illustrate the blocking member 170 in detail.

Figure 7B:
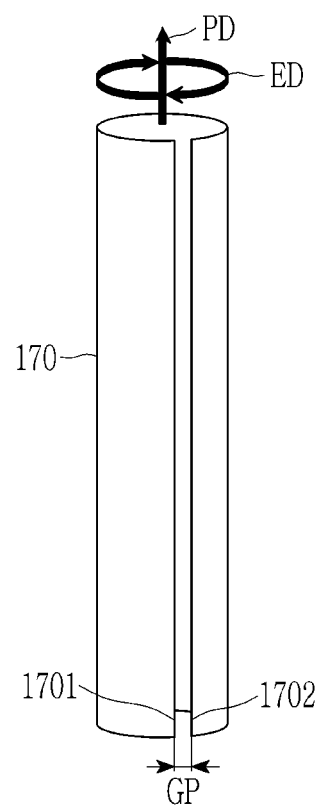

Referring to FIG. 7B, the blocking member 170 includes one slit GP for blocking generation of eddy currents. The slit GP extends along the direction PD that is perpendicular to the eddy current. Opposite ends 1701 and 1702 of the blocking member 170 are spaced apart by the slit GP. In exemplary embodiments, the slit GP may have a width of 0.03 mm or more along the direction ED of the eddy current.

Although the slit GP has been described as extending along the direction PD that is perpendicular to the eddy current, the slit GP may extend along a direction that is inclined at a predetermined angle (more than 0 degrees and less than 90 degrees) with respect to the direction PD. The opposite ends 1701 and 1702 of the blocking member 170 are spaced apart along the direction ED of the eddy current. Accordingly, since the eddy current cannot flow along the blocking member 170, generation of the eddy current is interrupted.

Figure 7C:
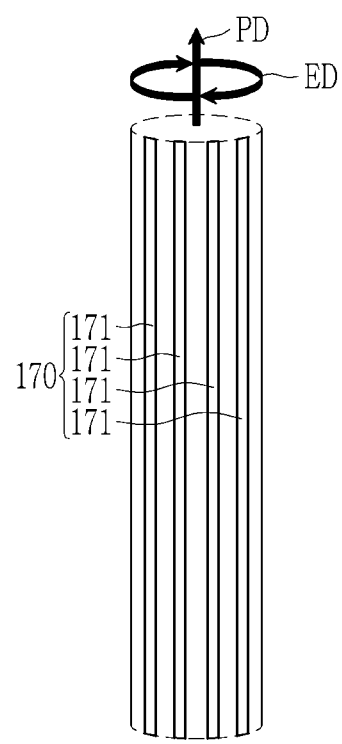

Referring to FIG. 7C, the blocking member 170 includes a plurality of first blocking units 171. The first blocking units 171 extend along the direction PD that is perpendicular to the eddy current, and are spaced apart from each other along the direction ED of the eddy current. Similarly, since the blocking member 170 includes the plurality of first blocking units 171 spaced apart from each other along the direction ED of the eddy current, no eddy current can flow along the blocking member 170, thereby blocking the generation of the eddy current. Although the first blocking units 171 have been described as extending along the direction PD that is perpendicular to the eddy current, the first blocking units 171 may extend along the direction that is inclined at a predetermined angle (more than 0 degrees and less than 90 degrees) with respect to the direction PD.

Figure 7D:
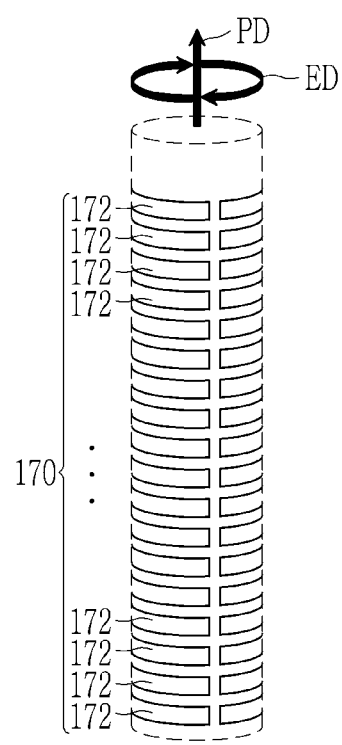

Referring to FIG. 7D, the blocking member 170 includes a plurality of second blocking units 172. The second blocking units 172 are spaced apart along the direction PD that is perpendicular to the eddy current, and opposite ends of each of the second blocking units 172 are spaced apart from each other along the direction ED of the eddy current. Similarly, since the opposite ends of each of the second blocking units 172 included in the blocking member 170 are spaced along the direction ED of the eddy current, no eddy current can flow along the blocking member 170, thereby blocking the generation of the eddy current.

Figure 7E:
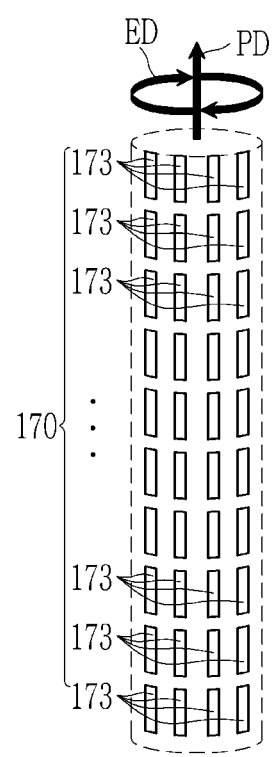

Referring to FIG. 7E, the blocking member 170 includes a plurality of third blocking units 173. The third blocking units 173 are spaced apart from each other along the direction PD that is perpendicular to the eddy current and the direction ED of the eddy current. Similarly, since the third blocking units 173 included in the blocking member 170 are spaced along the direction ED of the eddy current, no eddy current can flow along the blocking member 170, thereby blocking the generation of the eddy current.

The body portion 190 may include a form in which a horn portion and a pillar portion are combined. The body portion 190 is illustrated in a form in which the horn portion and the pillar portion are integrally combined, but the two portions may be separated. The pillar portion may have a circular cylindrical shape, a polygonal shape, a column shape having at least part of a shape of a curved surface, an entasis shape, a frustum of a pyramid shape, a truncated circular cone shape, or the like, but it is not limited thereto The body portion 190 may be made of a non-conductive material.

The blocking member 170 may be disposed on an inner surface, an outer surface, or an inner surface of the body portion 190, which will be described later with reference to FIG. 11 to FIG. 13.

Figure 8A:
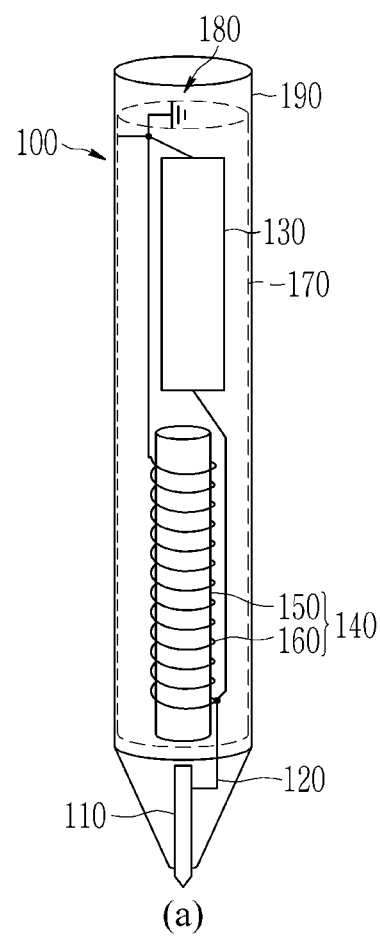

Next, referring to FIG. 8A, the stylus pen 101 includes a conductive tip 110, a conductive connection member 120, a capacitor portion 130, an inductor portion 140, a blocking member 170, a ground portion 180, and a body portion 190. Description of same or similar components as those shown in FIG. 7A will be omitted.

The stylus pen 101 has a difference in that the blocking member 170 is connected to the ground portion 180 compared with the stylus pen 100 of FIG. 7A. In addition, the blocking member 170 and the ground portion 180 may be connected at a position that is spaced apart from the inductor portion 140.

Figure 8B:
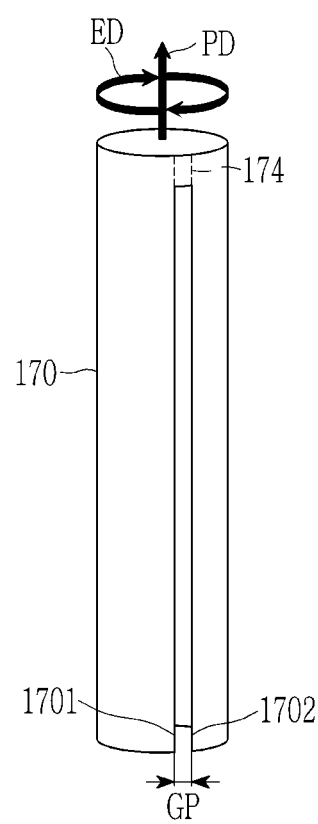
Figure 8C:
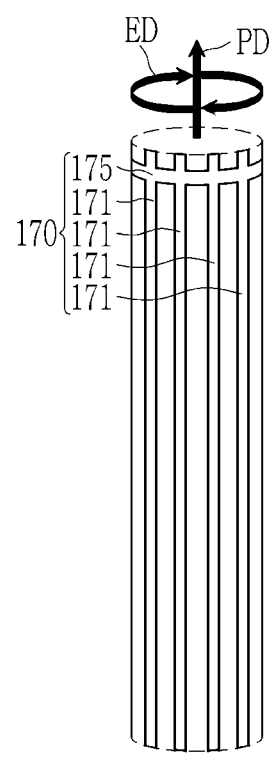
Figure 8D:
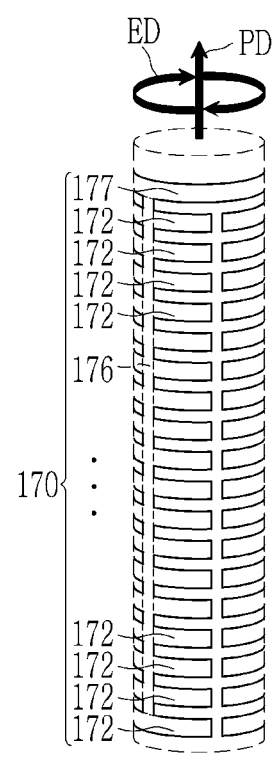

In this regard, FIG. 8B to FIG. 8D illustrate the blocking member 170 connected to the ground portion 180 in detail.

Referring to FIG. 8B, the blocking member 170 includes one slit GP for blocking generation of an eddy current and a connector 174 for connecting opposite ends 1701 and 1702 of the blocking member 170. The slit GP extends along the direction PD that is perpendicular to the eddy current. Opposite ends 1701 and 1702 of the blocking member 170 are spaced apart by the slit GP. The opposite ends 1701 and 1702 of the blocking member 170 are spaced apart along the direction ED of the eddy current. The width along the direction ED of the slit GP is equal to or less than the width along the direction ED of the blocking member 170.

The connector 174 may connect the opposite ends 1701 and 1702 of the blocking member 170 at a position that is spaced apart from the inductor portion 140 along a direction PD that is perpendicular to the eddy current. The blocking member 170 may be connected to the ground portion 180 at a position of the connector 174.

Referring to FIG. 8C, the blocking member 170 includes a plurality of first blocking units 171 and a first connector 175 connecting the first blocking units 171 to each other.

The first blocking units 171 extend along the direction PD that is perpendicular to the eddy current, and are spaced apart from each other along the direction ED of the eddy current. The distance at which the first blocking units 171 are spaced apart from each other along the direction ED is equal to or less than the width along the direction ED of the first blocking units 171.

The first connector 175 may connect the first blocking units 171 at a position that is spaced apart from the inductor portion 140 along the direction PD that is perpendicular to the eddy current. The blocking member 170 may be connected to the ground portion 180 at a position of the connector 175.

Referring to FIG. 8D the blocking member 170 includes a plurality of second blocking units 172, a second connector 176 connecting the second blocking units 172 to each other, and an additional ground portion 177. The distance at which the second blocking units 172 are spaced apart from each other along the direction ED is equal to or less than the width along the direction ED of the second blocking units 172.

The second blocking units 172 are spaced apart along the direction PD that is perpendicular to the eddy current, and opposite ends of each of the second blocking units 172 are spaced apart from each other along the direction ED of the eddy current.

The second connector 176 may extend from the inductor portion 140 along the direction PD that is perpendicular to the eddy current, and may connect a plurality of second blocking member 172 and the additional ground portion 177.

The additional ground portion 177 may be connected to the ground portion 180. In addition, the blocking member 177 and the ground portion 180 may be connected at a position that is spaced apart from the inductor portion 140.

Figure 9A:
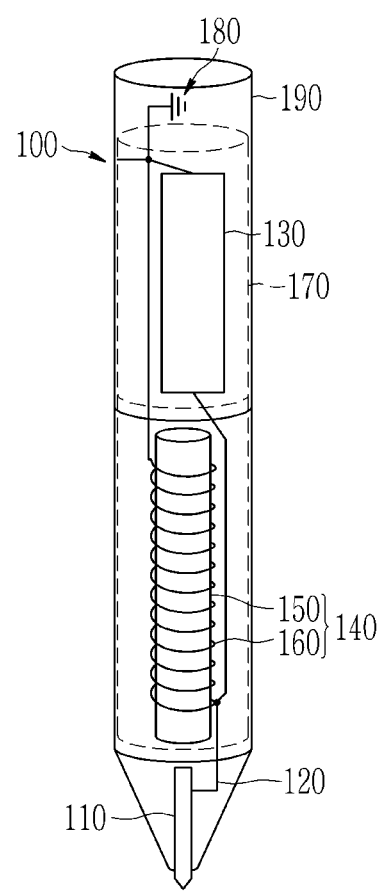

Next, referring to FIG. 9A, the stylus pen 102 includes a conductive tip 110, a conductive connection member 120, a capacitor portion 130, an inductor portion 140, a blocking member 170, a ground portion 180, and a body portion 190. Description of same or similar components as those shown in FIG. 8A will be omitted.

The stylus pen 102 has a difference in that the blocking member 170 includes a first blocking member 170a disposed to correspond to the inductor portion 140 and a second blocking member 170b connected to the ground portion 180 compared with the stylus pen 101 of FIG. 8A.

The first blocking member 170a may extend beyond a length CL of a ferrite core 150 of the inductor portion 140 along the direction PD that is perpendicular to the eddy current. The second blocking member 170b is connected to the first blocking member 170a.

Figure 9B:
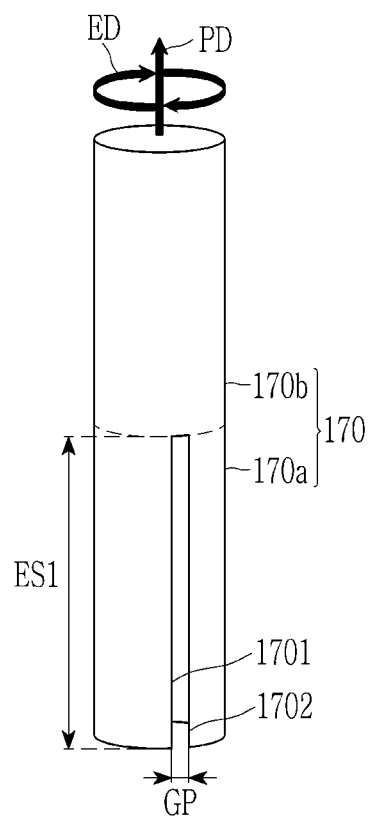
Figure 9C:
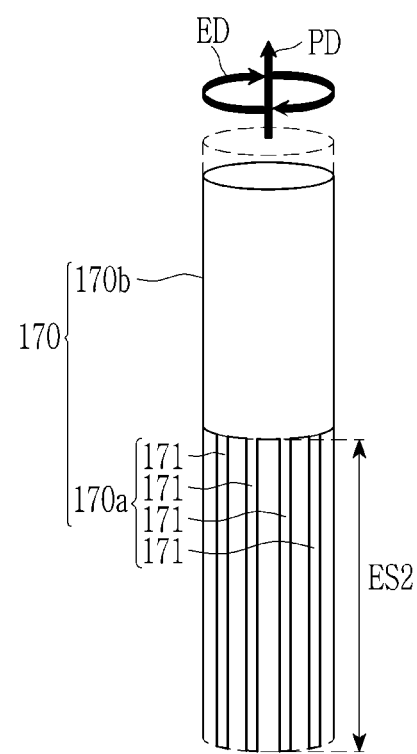
Figure 9D:
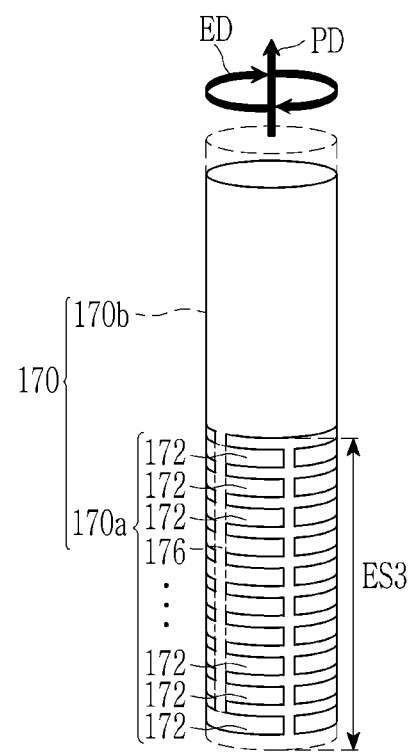

In this regard, FIG. 9B to FIG. 9D illustrate the blocking member 170 including the first blocking member 170a and the second blocking member 170b in detail.

Referring to FIG. 9B, the first blocking member 170a includes one slit GP for blocking generation of the eddy current. The slit GP extends to a lower end of the second blocking member 170b along the direction PD that is perpendicular to the eddy current. A length ES1 of the first blocking member 170a may be greater than or equal to the length CL of the ferrite core 150 of the inductor portion 140. A length of the slit GP also corresponds to the length ES1 of the first blocking member 170a.

The opposite ends 1701 and 1702 of the first blocking member 170a are spaced apart by the slit GP. The opposite ends 1701 and 1702 of the first blocking member 170a are spaced apart along the direction ED of the eddy current. Accordingly, since the eddy current cannot flow along the first blocking member 170a, generation of the eddy current is interrupted. The width along the direction ED of the slit GP is equal to or less than the width along the direction ED of first blocking member 170a.

The second blocking member 170b is coupled to an upper end of the first blocking member 170a. The second blocking member 170b may be connected to the ground portion 180. The second blocking member 170b is spaced apart from the ferrite core 150 of the inductor portion 140 along the direction PD. Thus, even when a slit is not formed in the second blocking member 170b, an influence of a magnetic field generated by the ferrite core 150 is small.

Referring to FIG. 9C, the blocking member 170a includes a plurality of first blocking units 171. The first blocking units 171 extend along the direction PD that is perpendicular to the eddy current, and are spaced apart from each other along the direction ED of the eddy current. A length ES2 of the first blocking member 170a may be greater than or equal to the length CL of the ferrite core 150 of the inductor portion 140. A length of the first blocking units 171 also corresponds to the length ES2 of the first blocking member 170a. Accordingly, since the eddy current cannot flow along the first blocking member 170a, generation of the eddy current is interrupted. The distance at which the first blocking units 171 are spaced apart from each other along the direction ED is equal to or less than the width along the direction ED of the first blocking units 171.

The second blocking member 170b is coupled to an upper end of the first blocking member 170a. The second blocking member 170b may be connected to the ground portion 180. The second blocking member 170b is spaced apart from the ferrite core 150 of the inductor portion 140 along the direction PD. Thus, even when the second blocking member 170b is not formed to include a plurality of blocking units, an influence of a magnetic field generated by the ferrite core 150 is small.

Referring to FIG. 9D, the first blocking member 170a includes a plurality of second blocking units 172 and a second connector 176 connecting the second blocking units 172 to each other. The second blocking units 172 are spaced apart along the direction PD that is perpendicular to the eddy current, and opposite ends of each of the second blocking units 172 are spaced apart from each other along the direction ED of the eddy current. Accordingly, since the eddy current cannot flow along the first blocking member 170a, generation of the eddy current is interrupted. A length ES3 of the first blocking member 170a may be greater than or equal to the length CL of the ferrite core 150 of the inductor portion 140. The distance at which the second blocking units 172 are spaced apart from each other along the direction ED is equal to or less than the width along the direction ED of the second blocking units 172.

The second connector 176 extends from the inductor portion 140 along the direction PD that is perpendicular to the eddy current, to connect the first blocking member 170a and the second blocking member 170b.

The second blocking member 170b is coupled to an upper end of the first blocking member 170a. The second blocking member 170b may be connected to the ground portion 180. The second blocking member 170b is spaced apart from the ferrite core 150 of the inductor portion 140 along the direction PD. Thus, even when the second blocking member 170b is not formed to include a plurality of blocking units, an influence of a magnetic field generated by the ferrite core 150 is small.

Figure 10A:
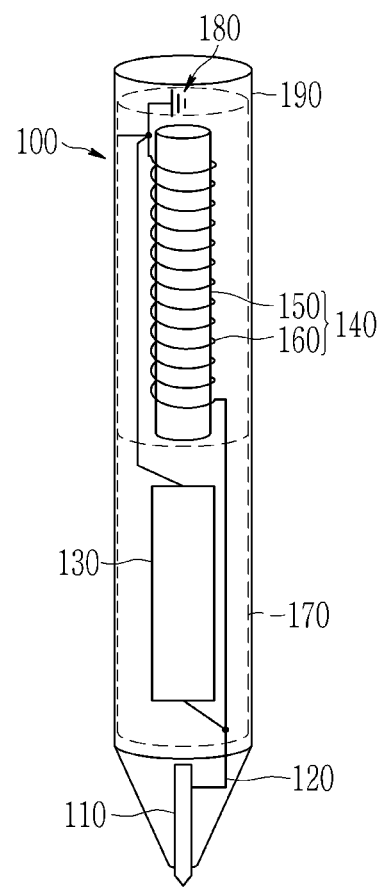

Next, referring to FIG. 10A, the stylus pen 103 includes a conductive tip 110, a conductive connection member 120, a capacitor portion 130, an inductor portion 140, a blocking member 170, a ground portion 180, and a body portion 190. Description of same or similar components as those shown in FIG. 8A will be omitted.

A position of the inductor part 140 in the body portion 190 of the stylus pen 103 is different from that of the inductor portion 140 within the body portion 190 of the stylus pen 102 of FIG. 9A. The inductor portion 140 is spaced apart from the conductive tip 110 in the body portion 190 of the stylus pen 103.

Figure 10B:
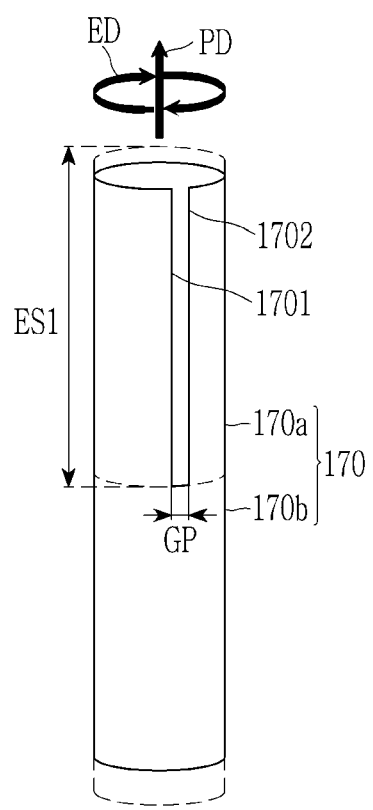

In this regard, FIG. 10B to FIG. 9D illustrate the blocking member 170 including the first blocking member 170a and the second blocking member 170b in detail.

Referring to FIG. 10B, the first blocking member 170a includes one slit GP for blocking generation of the eddy current. The slit GP extends to an upper end of the second blocking member 170b along a direction opposite to the direction PD that is perpendicular to the eddy current. A length ES1 of the first blocking member 170a may be greater than or equal to the length CL of the ferrite core 150 of the inductor portion 140. A length of the slit GP also corresponds to the length ES1 of the first blocking member 170a.

The opposite ends 1701 and 1702 of the first blocking member 170a are spaced apart by the slit GP. The opposite ends 1701 and 1702 of the first blocking member 170a are spaced apart along the direction ED of the eddy current. Accordingly, since the eddy current cannot flow along the first blocking member 170a, generation of the eddy current is interrupted. The width along the direction ED of the slit GP is equal to or less than the width along the direction ED of the blocking member 170.

The second blocking member 170b is coupled to a lower end of the first blocking member 170a. The second blocking member 170b is spaced apart from the ferrite core 150 of the inductor portion 140 along a direction opposite to the direction PD. Thus, even when a slit is not formed in the second blocking member 170b, an influence of a magnetic field generated by the ferrite core 150 is small.

Figure 10C:
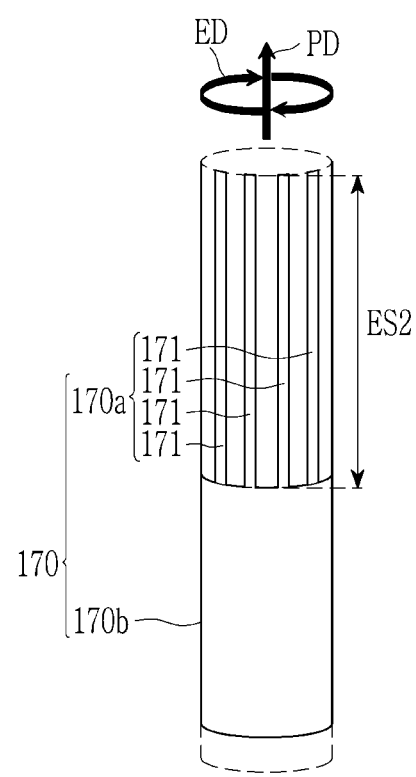

Referring to FIG. 10C, the blocking member 170a includes a plurality of first blocking units 171. The first blocking units 171 extend along the direction PD that is perpendicular to the eddy current, and are spaced apart from each other along the direction ED of the eddy current. A length ES1 of the first blocking member 170a may be greater than or equal to the length CL of the ferrite core 150 of the inductor portion 140. A length of the first blocking units 171 also corresponds to the length ES1 of the first blocking member 170a. Accordingly, since the eddy current cannot flow along the first blocking member 170a, generation of the eddy current is interrupted. The distance at which the first blocking units 171 are spaced apart from each other along the direction ED is equal to or less than the width along the direction ED of the first blocking units 171.

The second blocking member 170b is coupled to a lower end of the first blocking member 170a. The second blocking member 170b is spaced apart from the ferrite core 150 of the inductor portion 140 along a direction opposite to the direction PD. Thus, even when the second blocking member 170b is not formed to include a plurality of blocking units, an influence of a magnetic field generated by the ferrite core 150 is small.

Figure 10D:
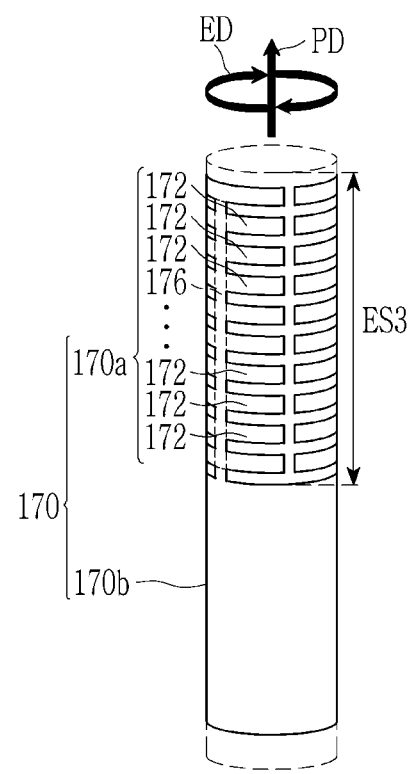

Referring to FIG. 10D, the blocking member 170a includes a plurality of second blocking units 172 and a second connector 176 connecting the first blocking units 172 to each other. The second blocking units 172 are spaced apart along the direction PD that is perpendicular to the eddy current, and opposite ends of each of the second blocking units 172 are spaced apart from each other along the direction ED of the eddy current. Accordingly, since the eddy current cannot flow along the first blocking member 170a, generation of the eddy current is interrupted. The distance at which the second blocking units 172 are spaced apart from each other along the direction ED is equal to or less than the width along the direction ED of the second blocking units 172.

The second connector 176 extends from the inductor portion 140 along the direction PD that is perpendicular to the eddy current, to connect the first blocking member 170a and the second blocking member 170b.

The second blocking member 170b is coupled to a lower end of the first blocking member 170a. The second blocking member 170b is spaced apart from the ferrite core 150 of the inductor portion 140 along a direction opposite to the direction PD. Thus, even when the second blocking member 170b is not formed to include a plurality of blocking units, an influence of a magnetic field generated by the ferrite core 150 is small.

Figure 11A:
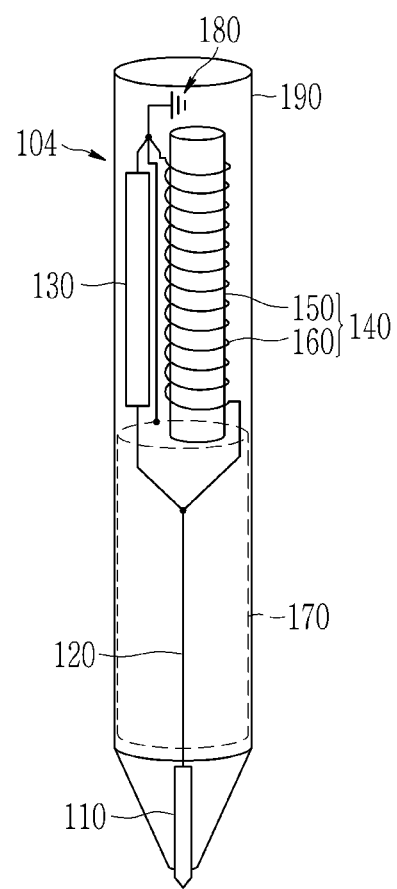

Next, referring to FIG. 11A, the stylus pen 104 includes a conductive tip 110, a conductive connection member 120, a capacitor portion 130, an inductor portion 140, a blocking member 170, a ground portion 180, and a body portion 190. Description of same or similar components as those shown in FIG. 8A will be omitted.

A position of the capacitor portion 130 in the body portion 190 of the stylus pen 104 is different from that of the capacitor portion 130 of the stylus pens 100, 101 and 102 of FIG. 7A, FIG. 8A, and FIG. 9A. The capacitor portion 130 is spaced apart from the conductive tip 110 in the body portion 190 of the stylus pen 104.

Similarly, the inductor portion 140 is spaced apart from the conductive tip 110 in the body portion 190 of the stylus pen 104.

The conductive tip 110 and the conductive connection member 120 are positioned at a front portion of the stylus pen 104, and the capacitor portion 130 and the inductor portion 140 are positioned at a rear portion of the stylus pen 104.

The stylus pen 104 further includes a blocking member 170 to minimize an influence of a user's hand on the conductive connection member 120 and to prevent occurrence of the eddy current by the inductor portion 140.

Figure 11B:
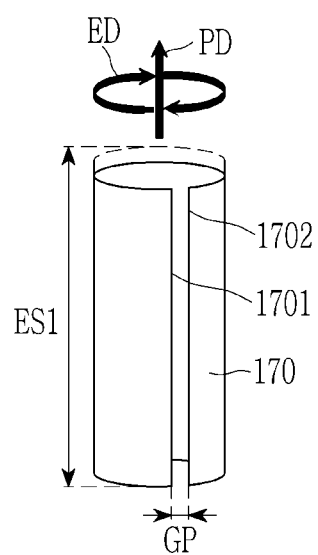
Figure 11C:
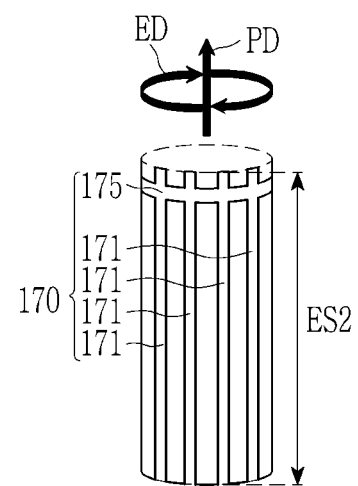
Figure 11D:
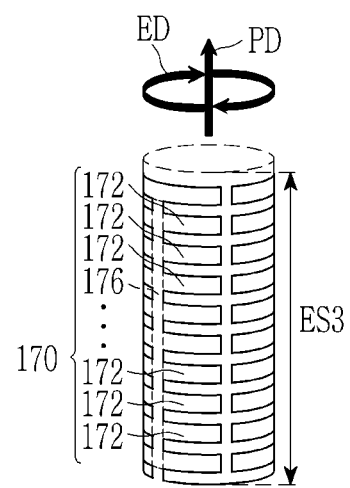

In this regard, FIG. 11B to FIG. 11D illustrate the blocking member 170 in detail.

Referring to FIG. 11B, the blocking member 170 includes one slit GP for blocking generation of an eddy current. The slit GP extends along a direction opposite to the direction PD that is perpendicular to the eddy current. The length ES1 of the blocking member 170 may correspond to the length of the conductive connection member 120.

Opposite ends 1701 and 1702 of the blocking member 170 are spaced apart by the slit GP. The opposite ends 1701 and 1702 of the blocking member 170 are spaced apart along the direction ED of the eddy current. Accordingly, since the eddy current cannot flow along the blocking member 170, generation of the eddy current is interrupted. The width along the direction ED of the slit GP is equal to or less than the width along the direction ED of the blocking member 170.

Referring to FIG. 11C, the blocking member 170 includes a plurality of first blocking units 171 and a first connector 175 connecting the first blocking units 171 to each other.

The first blocking units 171 extend along the direction PD that is perpendicular to the eddy current, and are spaced apart from each other along the direction ED of the eddy current. A length ES2 of the blocking member 170 may be greater than or equal to the length CL of the ferrite core 150 of the inductor portion 140. A length of the first blocking units 171 also corresponds to the length ES2 of the blocking member 170. Accordingly, since the eddy current cannot flow along the blocking member 170, generation of the eddy current is interrupted. The distance at which the first blocking units 171 are spaced apart from each other along the direction ED is equal to or less than the width along the direction ED of the first blocking units 171.

The first connection unit 175 may connect the first blocking units 171 to each other. The blocking member 170 may be electrically connected to the ground portion 180 at a position of the connector 175.

Referring to FIG. 11D, the blocking member 170 includes a plurality of second blocking units 172 and a second connector 176 connecting the second blocking units 172 to each other. The second blocking units 172 are spaced apart along the direction PD that is perpendicular to the eddy current, and opposite ends of each of the second blocking units 172 are spaced apart from each other along the direction ED of the eddy current. Accordingly, since the eddy current cannot flow along the blocking member 170, generation of the eddy current is interrupted. The distance at which the second blocking units 172 are spaced apart from each other along the direction ED is equal to or less than the width along the direction ED of the second blocking units 172.

The second connector 176 extends from the inductor portion 140 along the direction PD that is perpendicular to the eddy current.

According to at least one of the exemplary embodiments, it is possible to provide a stylus pen that is robust against external factors such as a user's grip.

According to at least one of the exemplary embodiments, an inductance value and a capacitance value of the stylus pen can be kept constant, and thus the resonance frequency may be kept constant, thereby improving touch sensitivity of the touch sensor.

Next, a positional relationship between the blocking member 170 and the body portion 190 will be described with reference to FIG. 12A to FIG. 14B.

FIG. 12 to FIG. 13 illustrate schematic views showing a structure of a body of a stylus pen according to exemplary embodiments.

The blocking member 170 may be plated on a sheet by a method such as plating, photolithography, sputtering, or the like to be attached to the body portion 190, or may be directly plated on the body portion 190 by a method such as plating, photolithography, thin film deposition, or the like, but the present invention is not limited thereto.

Figure 12A:
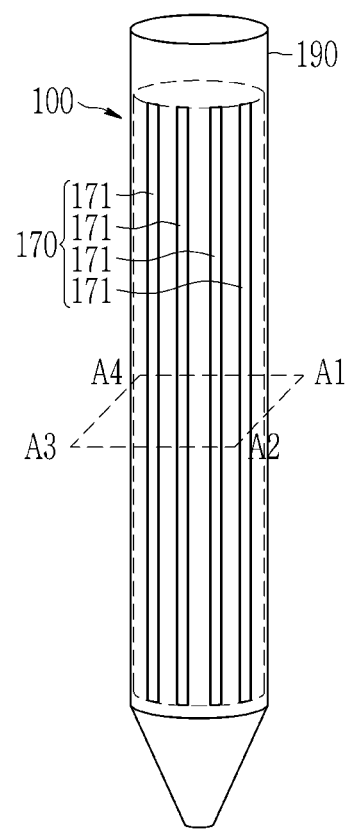
FIG. 12A to FIG. 14B illustrate schematic views showing a structure of a body of a stylus pen according to exemplary embodiments.

First, referring to FIG. 12A, the stylus pen 100 includes the blocking member 170 including the first blocking units 171 and the body portion 190.

Figure 12B:
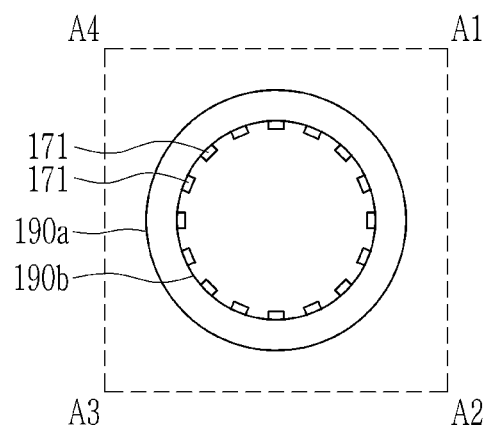

FIG. 12B illustrates a cross-section of the stylus pen 100 cut along incision surfaces A1, A2, A3, and A4. According to an exemplary embodiment, the first blocking units 171 may be disposed on an inner surface 190b of a body portion 190b.

Figure 13A:
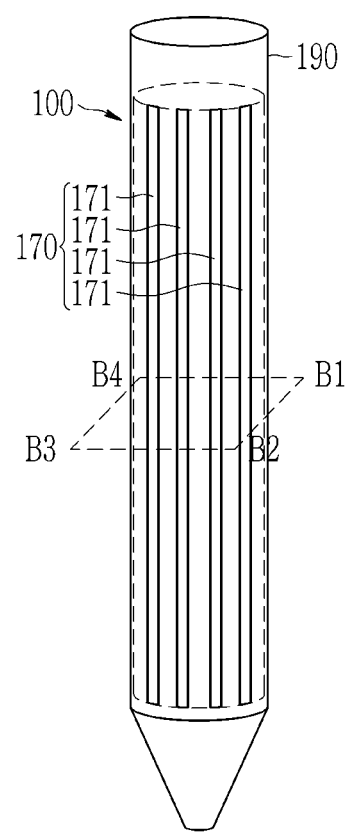

First, referring to FIG. 13A, the stylus pen 100 includes the blocking member 170 including the first blocking units 171 and the body portion 190.

Figure 13B:
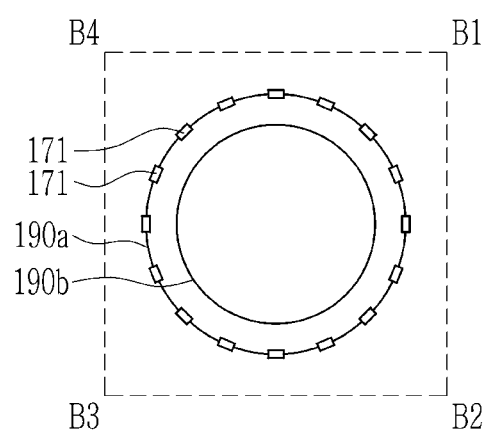

FIG. 13B illustrates a cross-section of the stylus pen 100 cut along incision surfaces B1, B2, B3, and B4. According to an exemplary embodiment, the first blocking units 171 may be disposed on an outer surface 190a of the body portion 190b.

Figure 14A:
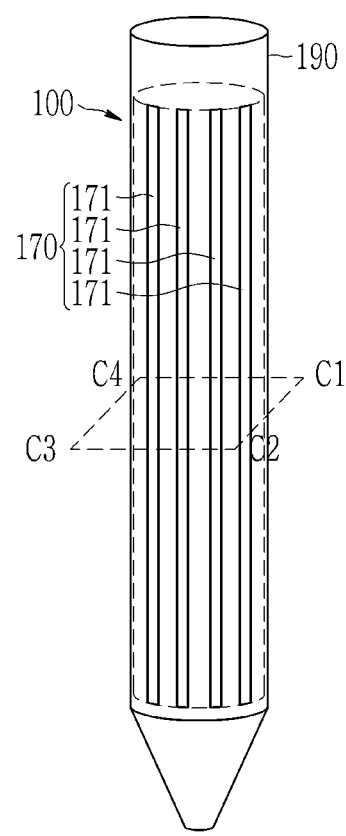

Finally, referring to FIG. 14A, the stylus pen 100 includes the blocking member 170 including the first blocking units 171 and the body portion 190.

Figure 14B:
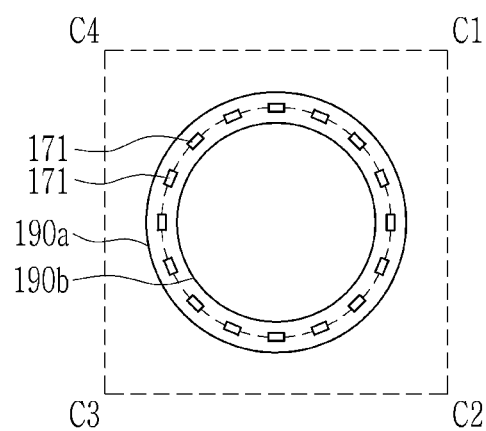

FIG. 14B illustrates a cross-section of the stylus pen 100 cut along incision surfaces C1, C2, C3, and C4. According to an exemplary embodiment, the first blocking units 171 may be disposed between the outer surface 190a and the inner surface 190b of the body portion 190.

The above detailed description should not be construed as limiting in all aspects and should be considered as illustrative. The scope of the present invention should be determined by reasonable interpretation of the appended claims, and all changes within the equivalent range of the present invention are included in the scope of the present invention.

The invention claimed is:

1. A stylus pen comprising:
a body portion;
a conductive tip configured to be exposed from an inside of the body portion to an outside of the body portion;
a resonance circuit portion disposed in the body portion to be connected to the conductive tip and to resonate an electrical signal transferred from the conductive tip; and
a conductive blocking member configured to surround at least a portion of the resonance circuit portion,
the blocking member includes one slit that blocks generation of an eddy current,
opposite ends of the blocking member are spaced apart in a first direction by the slit, and
the first direction is a direction in which an eddy current is generated.

2. The stylus pen of claim 1, further comprising
a ground portion configured to be capable of being electrically connected to a user.

3. The stylus pen of claim 2, wherein
the resonant circuit portion includes:
an inductor portion connected between the conductive tip and the ground portion;
a capacitor portion connected between the conductive tip and the ground portion; and
a conductive connection member connecting the conductive tip and the inductor.

4. The stylus pen of claim 3, wherein
the blocking member covers only the inductor portion.

5. The stylus pen of claim 3, wherein
the blocking member covers only the conductive connection member.

6. The stylus pen of claim 3, wherein
the blocking member further includes
a connector spaced apart from the inductor portion in the body portion along a second direction that is perpendicular to the first direction to connect opposite ends of the blocking portion.

7. The stylus pen of claim 6, wherein
the connector is electrically connected to the ground portion.

8. A stylus pen comprising:
a body portion;
a conductive tip configured to be exposed from an inside of the body portion to an outside of the body portion;
a resonance circuit portion disposed in the body portion to be connected to the conductive tip and to resonate an electrical signal transferred from the conductive tip; and
a conductive blocking member configured to surround at least a portion of the resonance circuit portion, wherein
the blocking member includes a plurality of first blocking units spaced apart from each other along the first direction and extending along a second direction that is perpendicular to the first direction,
the first direction is a direction in which an eddy current is generated, and
the first blocking units are conductive.

9. The stylus pen of claim 8, further comprising
a ground portion configured to be capable of being electrically connected to a user;
wherein the resonant circuit portion includes:
an inductor portion connected between the conductive tip and the ground portion;
a capacitor portion connected between the conductive tip and the ground portion; and
a conductive connection member connecting the conductive tip and the inductor, and
wherein the blocking member further includes
a connector spaced apart from the inductor portion in the body portion along the second direction to connect the first blocking units.

10. The stylus pen of claim 9, wherein
the connector is electrically connected to the ground portion.

11. A stylus pen comprising:
a body portion;
a conductive tip configured to be exposed from an inside of the body portion to an outside of the body portion;
a resonance circuit portion disposed in the body portion to be connected to the conductive tip and to resonate an electrical signal transferred from the conductive tip; and
a conductive blocking member configured to surround at least a portion of the resonance circuit portion, wherein
the blocking member include a plurality of second blocking units extending along the first direction and spaced apart from each other along a second direction that is perpendicular to the first direction,
the first direction is a direction in which an eddy current is generated, and
opposite ends of each of the second blocking units are spaced apart along the first direction.

12. The stylus pen of claim 11, further comprising
a ground portion configured to be capable of being electrically connected to a user;
wherein the resonant circuit portion includes:
an inductor portion connected between the conductive tip and the ground portion;
a capacitor portion connected between the conductive tip and the ground portion; and
a conductive connection member connecting the conductive tip and the inductor, and
wherein
the blocking member further includes:
a connector extending along the second direction to connect the second blocking units; and
an additional ground portion spaced apart from the inductor portion in the body portion along the second direction, and connected to a first end of the connector.

13. The stylus pen of claim 12, wherein
the additional ground portion is electrically connected to the ground portion.

14. The stylus pen of claim 3, wherein
the inductor portion includes:
a ferrite core; and
a conductive coil connected electrical the conductive tip and wound around the ferrite core.

15. The stylus pen of claim 3, wherein
the capacitor portion includes a plurality of capacitors connected in parallel and having different capacitances from each other.

16. The stylus pen of claim 1, wherein
the blocking member disposed on an inner surface of the body portion.

17. The stylus pen of claim 1, wherein
the blocking member is disposed on an external surface of the body portion.

18. The stylus pen of claim 1, wherein
the blocking member is disposed between the inner and outer surfaces of the body portion.

19. A stylus pen comprising:
a body portion;
a conductive tip configured to be exposed from an inside of the body portion to an outside of the body portion;
a resonance circuit portion disposed in the body portion to be connected to the conductive tip and to resonate an electrical signal transferred from the conductive tip; and
a conductive blocking member configured to surround at least a portion of the body portion,
wherein the blocking member includes one slit that blocks generation of an eddy current,
opposite ends of the blocking member are spaced apart in a first direction by the slit, and
the first direction is a direction in which an eddy current is generated.

20. The stylus pen of claim 19, wherein the resonant circuit portion includes:
an inductor portion connected between the conductive tip and the ground portion;
a capacitor portion connected between the conductive tip and the ground portion; and
a conductive connection member connecting the conductive tip and the inductor.

21. A stylus pen comprising:
a body portion;
a conductive blocking member configured to surround at least a portion of the body portion; and
a conductive tip configured to be exposed from an inside of the body portion to an outside of the body portion,
wherein at least one slit configured to block generation of an eddy current, and
wherein the blocking member includes a plurality of blocking units plated on a sheet.

22. The stylus pen of claim 21, wherein the blocking member disposed on an inner surface of the body portion.

23. The stylus pen of claim 21, wherein the blocking member is disposed on an external surface of the body portion.

24. The stylus pen of claim 21, wherein the blocking member is disposed between the inner and outer surfaces of the body portion.

25. A stylus pen comprising:
a body portion;
a conductive blocking member configured to surround at least a portion of the body portion; and
a conductive tip configured to be exposed from an inside of the body portion to an outside of the body portion,
wherein at least one slit configured to block generation of an eddy current, and
wherein
the blocking member includes a plurality of blocking units plated on the body portion.

26. The stylus pen of claim 1, wherein the width of the slit in the first direction is equal to or less than the width in the first direction of the blocking member.

27. The stylus pen of claim 8, wherein the width at which the plurality of first blocking units are spaced apart from each other in the first direction is equal to or less than the width in the first direction of the first blocking unit.

28. The stylus pen of claim 11, wherein the width at which the plurality of second blocking units are spaced apart from each other in the first direction is equal to or less than the width in the first direction of the second blocking unit.

29. The stylus pen of claim 19, wherein the width of the slit in the first direction is equal to or less than the width in the first direction of the blocking member.

* * * * *